US011881146B2

(12) United States Patent
Chang et al.

(10) Patent No.: US 11,881,146 B2
(45) Date of Patent: Jan. 23, 2024

(54) BACKLIGHT MODULE AND DISPLAY DEVICE

(71) Applicant: HKC CORPORATION LIMITED, Shenzhen (CN)

(72) Inventors: Hongyan Chang, Shenzhen (CN); Wei Li, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 18/077,581

(22) Filed: Dec. 8, 2022

(65) Prior Publication Data

US 2023/0335034 A1 Oct. 19, 2023

(30) Foreign Application Priority Data

Apr. 19, 2022 (CN) ........................ 202210410608.6

(51) Int. Cl.
*G09G 3/20* (2006.01)
*G09G 3/34* (2006.01)

(52) U.S. Cl.
CPC ......... *G09G 3/2074* (2013.01); *G09G 3/3426* (2013.01); *G09G 2320/0233* (2013.01); *G09G 2360/16* (2013.01)

(58) Field of Classification Search
CPC ............... G09G 3/2074; G09G 3/3426; G09G 2320/0233; G09G 2360/16
See application file for complete search history.

(56) References Cited

U.S. PATENT DOCUMENTS

| | | | | |
|---|---|---|---|---|
| 10,559,254 | B2 * | 2/2020 | Park | G09G 3/3233 |
| 11,488,511 | B2 * | 11/2022 | Yu | G09G 5/026 |
| 2008/0309609 | A1 | 12/2008 | Feng | |
| 2011/0248979 | A1 * | 10/2011 | Nishimura | G09G 3/3651 345/211 |
| 2016/0365032 | A1 | 12/2016 | Wu et al. | |
| 2018/0182321 | A1 | 6/2018 | Zeng et al. | |
| 2021/0407368 | A1 * | 12/2021 | Gao | G09G 3/3685 |

FOREIGN PATENT DOCUMENTS

| | | | |
|---|---|---|---|
| CN | 101566744 | A | 10/2009 |
| CN | 101656048 | A | 2/2010 |
| CN | 105336298 | A | 2/2016 |
| CN | 106444116 | A | 2/2017 |

(Continued)

*Primary Examiner* — Gene W Lee
(74) *Attorney, Agent, or Firm* — Maier & Maier, PLLC

(57) ABSTRACT

A backlight module and display device, related to the display field. The backlight module includes a plurality of light-emitting elements and a controller, where the plurality of light-emitting elements serve as light sources for a plurality of sub-pixels respectively; and the controller is configured to control a brightness of each of the plurality of light-emitting elements. When the backlight module is in operation, if an i-th data line does not need to charge one of a plurality of sub-pixels connected to the i-th data line, the controller increases the brightness of the light-emitting element corresponding to a next sub-pixel when the next sub-pixel emits light. In this way, each sub-pixel can have an actual gray scale that reaches a target gray scale thereof, so that the uniformity of brightness of the display panel is improved.

16 Claims, 3 Drawing Sheets

(56) References Cited

FOREIGN PATENT DOCUMENTS

| | | | |
|---|---|---|---|
| CN | 107492353 | A | 12/2017 |
| CN | 108428436 | A | 8/2018 |
| CN | 108597457 | A | 9/2018 |
| CN | 112216237 | A | 1/2021 |
| CN | 112885299 | A | 6/2021 |
| CN | 113376912 | A | 9/2021 |
| CN | 114236900 | A | 3/2022 |
| JP | 2018054683 | A | 4/2018 |
| WO | 2018090577 | A1 | 5/2018 |

* cited by examiner

BACKLIGHT MODULE AND DISPLAY DEVICE

CROSS-REFERENCE TO RELATED APPLICATION

Pursuant to 35 U.S.C. § 119 and the Paris Conversion, this application claims priority to Chinese Patent Application No. 202210410608.6 filed Apr. 19, 2022, the entire contents of which are incorporated herein by reference.

TECHNICAL FIELD

The present application relates to the field of displaying technologies, and in particular, to a backlight module and a display device.

BACKGROUND

A display device includes a backlight module and a display panel. The display panel includes a plurality of scan lines, a plurality of data lines, a plurality of sub-pixels, and a plurality of switch circuits in a one-to-one correspondence with the plurality of sub-pixels. The backlight module provides light sources for the plurality of sub-pixels on the display panel. When the display panel is in operation, the scan line controls the switch circuit to be on, and the data line writes a data voltage to the corresponding sub-pixel through the switch circuit, so as to charge the sub-pixel and make the sub-pixel emit light.

In the related art, when the display device displays a frame of image, the plurality of scan lines, starting from the first one, output scan signals one by one to control the plurality of sub-pixels to emit light row by row. In this process, the polarity of the data voltage output by each data line with respect to the common voltage remains unchanged.

However, if a data line does not need to charge one of the plurality of sub-pixels to which it is connected, then when the data line charges the next sub-pixel, the voltage in the data line needs to rise from zero. This will cause the charging amount of the next sub-pixel to fail to reach the one desired for light emission, thereby resulting in non-uniform brightness of the display panel.

SUMMARY

The present application provides a backlight module and display device to solve the problem of non-uniformity of brightness of the display panel in the related art. The f technical solutions adopted in the present application are described below:

A backlight module is provided in the first aspect of the present application. The backlight module is applied to a display device including a display panel, where the display panel includes a plurality of sub-pixels and M data lines; and each of the M data lines is connected to at least two of the plurality of sub-pixels, M being an integer greater than 3;

the backlight module includes a plurality of light-emitting elements and a controller; the plurality of light-emitting elements are in a one-to-one correspondence with the plurality of sub-pixels, such that the plurality of light-emitting elements serve as light sources for the plurality of sub-pixels respectively; and the controller is configured to control a brightness of each of the plurality of light-emitting elements; and the controller is further configured to control a first brightness to be greater than a second brightness when a (j+1)-th sub-pixel connected to an i-th data line of the M data lines has a same target gray scale, where the first brightness is the brightness of the light-emitting element corresponding to the (j+1)-th sub-pixel connected to the i-th data line when a j-th sub-pixel connected to the i-th data line does not emit light; the second brightness is the brightness of the light-emitting element corresponding to the (j+1)-th sub-pixel connected to the i-th data line when the j-th sub-pixel connected to the i-th data line emits light; and i is an integer greater than 1 and less than M, and j is a positive integer.

In the present application, the backlight module includes the plurality of light-emitting elements and the controller. The plurality of light-emitting elements are served as light sources for the plurality of sub-pixels respectively. The controller is configured to control the brightness of each of the light-emitting elements. When the backlight module is in operation, for the (j+1)-th sub-pixel with the same target gray scale and connected to the i-th data line, the controller is configured to control the first brightness to be greater than the second brightness. The first brightness is the brightness of the light-emitting element corresponding to the (j+1)-th sub-pixel connected to the i-th data line when a j-th sub-pixel connected to the i-th data line does not emit light. The second brightness is the brightness of the light-emitting element corresponding to the (j+1)-th sub-pixel connected to the i-th data line when the j-th sub-pixel connected to the i-th data line emits light. That is, if the i-th data line does not need to charge one of the plurality of sub-pixels connected to the i-th data line, when the next sub-pixel emits light, the controller increases the brightness of the light-emitting element corresponding to the next sub-pixel. In this way, the next sub-pixel can have the actual gray scale that reaches the target gray scale thereof, so that the uniformity of brightness of the display panel is improved.

In some embodiments, the backlight module further includes a plurality of drive circuits corresponding to the plurality of light-emitting elements, respectively; and each of the plurality of drive circuits has a first input terminal connected to an output terminal of a power supply and an output terminal connected to the corresponding light-emitting element; and each of the plurality of drive circuits further has a second input terminal connected to the controller; and the controller is further configured to control the brightness of each of the plurality of light-emitting elements by controlling a drive current output by each of the plurality of drive circuits to the corresponding light-emitting element.

In some embodiments, each of the plurality of drive circuits includes a first transistor, a second transistor, and a capacitor, where the first transistor has an input terminal connected to the output terminal of the power supply, an output terminal connected to the light-emitting element corresponding to the drive circuit, and a control terminal connected to an output terminal of the second transistor;

the capacitor has a first electrode plate connected to the input terminal of the first transistor and a second electrode plate connected to the control terminal of the first transistor; and an input terminal of the second transistor is connected to the controller, and the controller is configured to control the drive current output by the drive circuit to the corresponding light-emitting element by controlling a voltage output to the input terminal of the second transistor.

In some embodiments, the controller stores a first correspondence relationship, which is a correspondence between the target gray scale and a first voltage; and the controller is configured to: obtain, when the j-th sub-pixel connected to the i-th data line does not emit light, the corresponding first voltage from the first correspondence relationship according to the target gray scale of the (j+1)-th sub-pixel connected to the i-th data line, and input a voltage to the input terminal of the second transistor of the drive circuit corresponding to the (j+1)-th sub-pixel connected to the i-th data line according to the first voltage; and the controller further stores a second correspondence relationship, which is a correspondence between the target gray scale and a second voltage; the first voltage corresponding to any target gray scale in the first correspondence relationship is greater than the second voltage corresponding to the any target gray scale in the second correspondence relationship; and the controller is configured to: obtain, when the j-th sub-pixel connected to the i-th data line emits light, the corresponding second voltage from the second correspondence relationship according to the target gray scale of the (j+1)-th sub-pixel connected to the i-th data line, and input a voltage to the input terminal of the second transistor of the drive circuit corresponding to the (j+1)-th sub-pixel connected to the i-th data line according to the second voltage.

In some embodiments, when the target gray scale is greater than or equal to 0 and less than or equal to 8, a difference between the first voltage and the second voltage increases by 0.15V each time when the target gray scale increases by 1; when the target gray scale is greater than 8 and less than or equal to 20, the difference value between the first voltage and the second voltage increases by 0.02V each time when the target gray scale increases by 1; when the target gray scale is greater than 20 and less than or equal to 220, the difference value between the first voltage and the second voltage increases by 0.01V each time when the target gray scale increases by 1; when the target gray scale is greater than 220 and less than or equal to 225, the difference value between the first voltage and the second voltage increases by 0.02V each time when the target gray scale increases by 1; when the target gray scale is greater than 225 and less than or equal to 238, the difference value between the first voltage and the second voltage increases by 0.03V each time when the target gray scale increases by 1; when the target gray scale is greater than 238 and less than or equal to 244, the difference value between the first voltage and the second voltage increases by 0.04V each time when the target gray scale increases by 1; when the target gray scale is greater than 244 and less than or equal to 247, the difference value between the first voltage and the second voltage increases by 0.05V each time when the target gray scale increases by 1; and when the target gray scale is greater than 247 and less than or equal to 255, the difference value between the first voltage and the second voltage increases by 0.06V each time when the target gray scale increases by 1.

In some embodiments, if a target gray scale of a p-th sub-pixel connected to a first data line of the M data lines is equal to the target gray scale of the (j+1)-th sub-pixel connected to the i-th data line, the controller controls a third brightness to be equal to the first brightness; the third brightness is the brightness of the light-emitting element corresponding to the p-th sub-pixel connected to the first data line; p is a positive integer; and a color of the p-th sub-pixel connected to the first data line is the same as a color of the (j+1)-th sub-pixel connected to the i-th data line.

In some embodiments, if a target gray scale of a p-th sub-pixel connected to an M-th data line of the M data lines is equal to the target gray scale of the (j+1)-th sub-pixel connected to the i-th data line, the controller controls a fourth brightness to be equal to the first brightness; the fourth brightness is the brightness of the light-emitting element corresponding to the p-th sub-pixel connected to the M-th data line; p is a positive integer; and a color of the p-th sub-pixel connected to the M-th data line is the same as a color of the (j+1)-th sub-pixel connected to the i-th data line.

In some embodiments, each of the plurality of light-emitting elements is a sub-millimeter light-emitting diode (mini LED) or a micro light-emitting diode (micro LED).

In a second aspect of the present application, a display device is further provided, the display panel includes a display panel and the backlight module;

the display panel includes a plurality of sub-pixels and M data lines; and each of the M data lines is connected to at least two of the plurality of sub-pixels, M is an integer greater than 3.

In some embodiments, the plurality of sub-pixels are arranged in N rows and M−1 columns, and j is a positive integer less than or equal to N−1; and the first data line of the M data lines is connected to a first sub-pixel in an odd-numbered row, the M-th data line is connected to an (M−1)-th sub-pixel in an even-numbered row, and the i-th data line is connected to an i-th sub-pixel in the odd-numbered row and an (i−1)-th sub-pixel in the even-numbered row.

It should be understood that, regarding the beneficial effects in the second aspect, reference can be made to relevant description in the first aspect, and the beneficial effects in the second aspect are not be repeatedly described herein.

BRIEF DESCRIPTION OF THE DRAWINGS

To describe the technical solutions in the embodiments of the present application more clearly, the drawings required for describing the embodiments are briefly described below. Apparently, the drawings in the following description show merely some embodiments of the present application, and those of ordinary skill in the art may still derive other drawings from these drawings without paying creative labors.

DETAILED DESCRIPTION OF THE EMBODIMENTS

Figure 1:
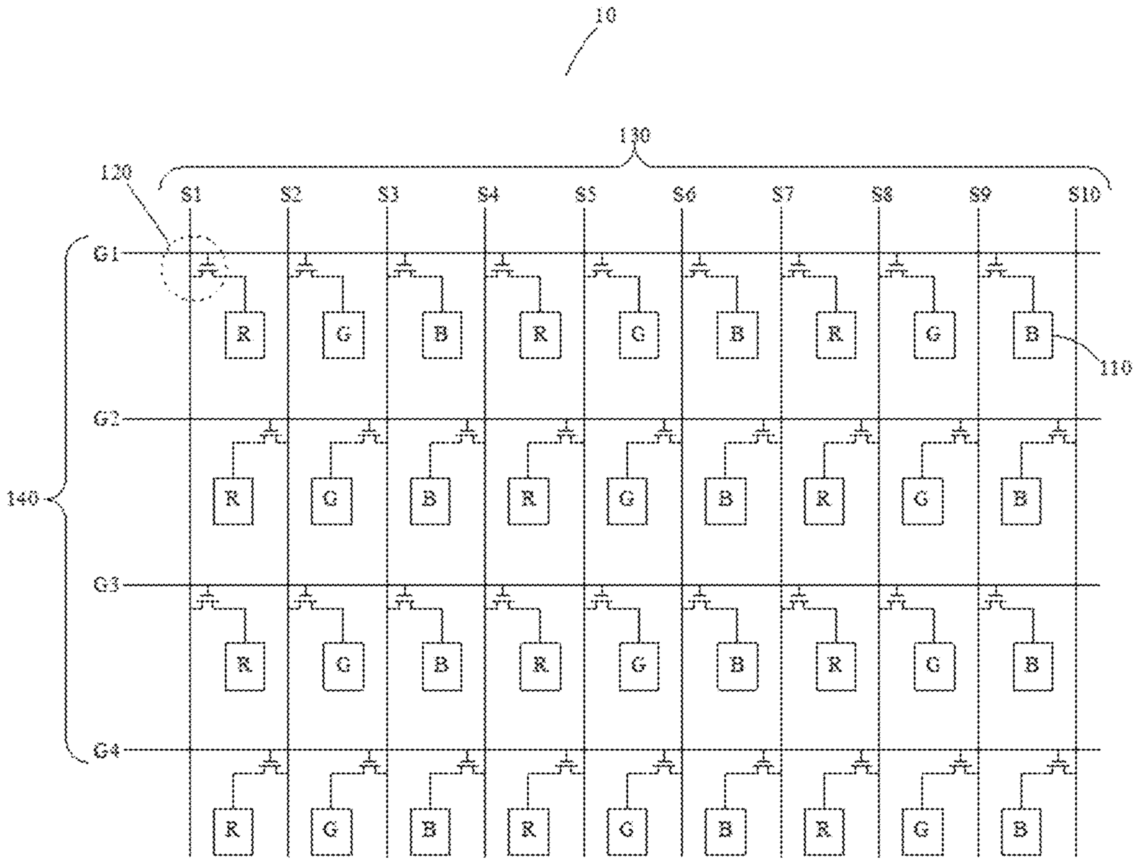
FIG. 1 is a structural diagram of a display panel provided by the first embodiment of the present application.

To make the objective, technical solutions, and advantages of the present application be clearer, the implementations of the present application are described in further detail below with reference to the drawings.

It should be understood that the term "a plurality of" herein means two or more. In the description of the present application, unless otherwise specified, "/" means "or", for example, "A/B" means "A or B". The term "and/or" herein merely describes three types of associations between associated objects. For example, "A and/or B" means "A alone", "A and B", or "B alone". In order to clearly describe the technical solutions of the present application, terms such as "first" and "second" are used to distinguish the same or similar items that have basically the same function and effect. Those skilled in the art should understand that the terms such as "first" and "second" are not intended to limit the number and execution sequence and are not necessarily intended to be different.

The working principle of a backlight module provided by an embodiment of the present application is described in detail below according to the structure of a display panel.

The backlight module is applied to a display device, which includes the backlight module and the display panel. The display panel includes a plurality of sub-pixels, a plurality of switch circuits, a plurality of scan lines, and a plurality of data lines. The number of the switch circuits is equal to the number of the sub-pixels. The plurality of switch circuits are connected to the plurality of sub-pixels in a one-to-one correspondence manner. Each switch circuit has an input terminal, an output terminal, and a control terminal. The control terminal of the switch circuit is configured to control the connection and disconnection between the input terminal and the output terminal of the switch circuit. Each of the plurality of switch circuits has the input terminal connected to one data line, the control terminal connected to one scan line, and the output terminal connected to the corresponding sub-pixel. When a scan line outputs a scan signal, all switch circuits connected to the scan line are on. When a switch circuit is on, a data voltage in the data line is output by the switch circuit to the sub-pixel connected to the switch circuit. In general, each sub-pixel may include a pixel electrode, and may further include a color resist located on the pixel electrode. The pixel electrode is configured to form a voltage difference with a common electrode. A liquid crystal is provided between the pixel electrode and the common electrode. When there is a voltage difference between the pixel electrode and the common electrode, an electric field is formed between the pixel electrode and the common electrode. The liquid crystal is rotated under the action of the electric field, such that light emitted by the backlight source passes through the sub-pixel to achieve the purpose of light-emitting display. Generally, the voltage of the common electrode is fixed, and the data voltage in the data line is output to the pixel electrode. The plurality of switch circuits connected to the same data line are connected to different scan lines, such that the data voltage can be input to each sub-pixel independently.

FIG. 1 is a structural diagram of a display panel 10 according to the present application. As shown in FIG. 1, the display panel 10 includes 36 sub-pixels 110, 36 switch circuits 120, 4 scan lines 140, and 10 data lines 130. The 36 sub-pixels 110 are arranged in 4 rows and 9 columns, and the 36 sub-pixels 110 include 12 red (R) sub-pixels, 12 green (G) sub-pixels, and 12 blue (B) sub-pixels. The switch circuits 120 and the sub-pixels 110 are in a one-to-one correspondence, and the output terminal of each switch circuit 120 is connected to the corresponding sub-pixel 110. For the convenience of description, the 10 data lines 130 are denoted as S1, S2 . . . and S10, respectively, and the 4 scan lines 140 are denoted as G1, G2, G3, and G4, respectively. Each data line 130 extends in the column direction, and each scan line 140 extends in the row direction. The control terminals of the switch circuits 120 corresponding to the sub-pixels 110 in the first row are connected to G1. The control terminals of the switch circuits 120 corresponding to the sub-pixels 110 in the second row are connected to G2. The connection relationships of other control terminals can be deduced in the same way. S1 is connected to the input terminals of the switch circuits 120 corresponding to the first sub-pixels 110 in the odd-numbered rows (the first and third rows). S10 is connected to the input terminals of the switch circuits 120 corresponding to the ninth sub-pixels 110 in the even-numbered rows (the second and fourth rows). Between S1 and S10, Si is connected to the input terminal of the switch circuit 120 corresponding to the i-th sub-pixel 110 in the odd-numbered row and the input terminal of the switch circuit 120 corresponding to the (i−1)-th sub-pixel 110 in the even-numbered row. Si refers to the i-th data line 130 from left to right along the paper, and i is an integer greater than 1 and less than 10, such as 2, 3, 4 or 9.

When the display panel 10 displays a frame of image, G1, G2, G3, and G4 successively output scan signals. When G1 outputs the scan signal, the switch circuits 120 corresponding to the sub-pixels 110 in the first row are all on. S1 to S9 output data voltages to charge all the sub-pixels 110 in the first row, such that all the sub-pixels 110 in the first row emit light. When G2 outputs the scan signal, the switch circuits 120 corresponding to the sub-pixels 110 in the second row are all on. S2 to S10 output data voltages to charge all the sub-pixels 110 in the second row, such that all the sub-pixels 110 in the second row emit light. Similarly, when G4 outputs the scan signal, the switch circuits 120 corresponding to the sub-pixels 110 in the fourth row are all on. S2 to S10 output data voltages to charge all the sub-pixels 110 in the fourth row, such that all the sub-pixels 110 in the fourth row emit light. In the process of displaying one frame of image, the polarity of the data voltage output by each data line 130 with respect to a common voltage remains unchanged. In the process of displaying the next frame image, the polarity of the data voltage output by each data line 130 with respect to the common voltage may change. For example, the common voltage is 0 V, and the display panel 10 is configured to display a solid color image (each sub-pixel 110 has the same gray scale). In this case, when the first frame image is displayed, the data voltage output by S1 may be fixed to 7 V, the data voltage output by S2 may be fixed to −7 V, the data voltage output by S3 may be fixed to 7 V, . . . , and similarly, the data voltage output by S10 may be fixed to −7 V. When the second frame image is displayed, the data voltage output by S1 may be fixed to −7 V, the data voltage output by S2 may be fixed to 7 V, the data voltage output by S3 may be fixed to −7 V, . . . , and similarly, the data voltage output by S10 may be fixed to 7 V.

However, in some specific application environments, some sub-pixels 110 in the display panel 10 do not emit light, that is, the data lines 130 do not need to charge some sub-pixels 110. For example, when the display panel 10 is configured to display a B-G frame, all R sub-pixels in the display panel 10 do not emit light. For example, for the four sub-pixels 110 connected to S3 and the four sub-pixels 110 connected to S5, when G1 outputs the scan signal, S3 outputs the data voltage (e.g., 7 V) to the third sub-pixel 110 in the first row, that is, the B sub-pixel. When G2 outputs the scan signal, S3 outputs the data voltage (e.g., 7 V) to the second sub-pixel 110 in the second row, that is, the G sub-pixel. When G1 and G2 successively output the scan signals, the voltage in S3 is always 7 V. In other words, in this process, the data voltage to be written by the second sub-pixel 110 in the second row does not need to rise from 0 V to 7 V. When G2 outputs the scan signal, S5 does not need to output the data voltage to the fourth sub-pixel 110 in the second row, that is, the R sub-pixel. At this time, the voltage in S5 is 0. When G3 outputs the scan signal, S5 needs to output the data voltage (e.g., 7 V) to the fifth sub-pixel 110 in the third row, that is, the G sub-pixel. When G3 outputs the scan signal, the voltage in S5 needs to rise from 0 V to 7 V. In other words, in this process, the data voltage to be written by the fifth sub-pixel 110 in the third row needs to rise from 0 V to 7 V. In this case, the charging amount of the fifth sub-pixel 110 in the third row must be lower than that of the second sub-pixel 110 of the same color in the second row. Based on the same principle, in the entire display panel 10, the charging amounts of the second sub-pixel 110 connected to S2 in the third row, the fifth sub-pixel 110 connected to S5 in the third row, and the eighth sub-pixel 110 connected to S8 in the third row are lower than those of the G sub-pixels connected to S3, S6, and S9. In addition, the charging amounts of the third sub-pixel 110 connected to S4 in the second row, the third sub-pixel 110 connected to S4 in the fourth row, the sixth sub-pixel 110 connected to S7 in the second row, and the sixth sub-pixel 110 connected to S7 in the fourth row are lower than those of the third sub-pixel 110 connected to S3 in the third row and the sixth sub-pixel 110 connected to S6 in the third row. Generally, for two sub-pixels 110 of the same color and the same backlight brightness, a sub-pixel 110 with a larger charging amount has a higher brightness than the other sub-pixel 110.

Figure 2:
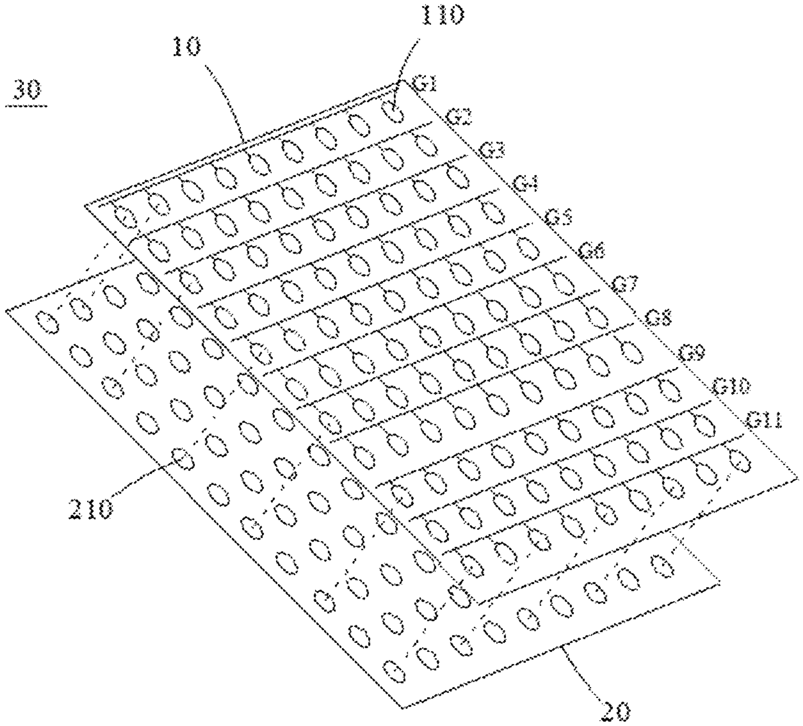
FIG. 2 is a structural diagram of a display device provided by the first embodiment of the present application from a first perspective.
Figure 3:
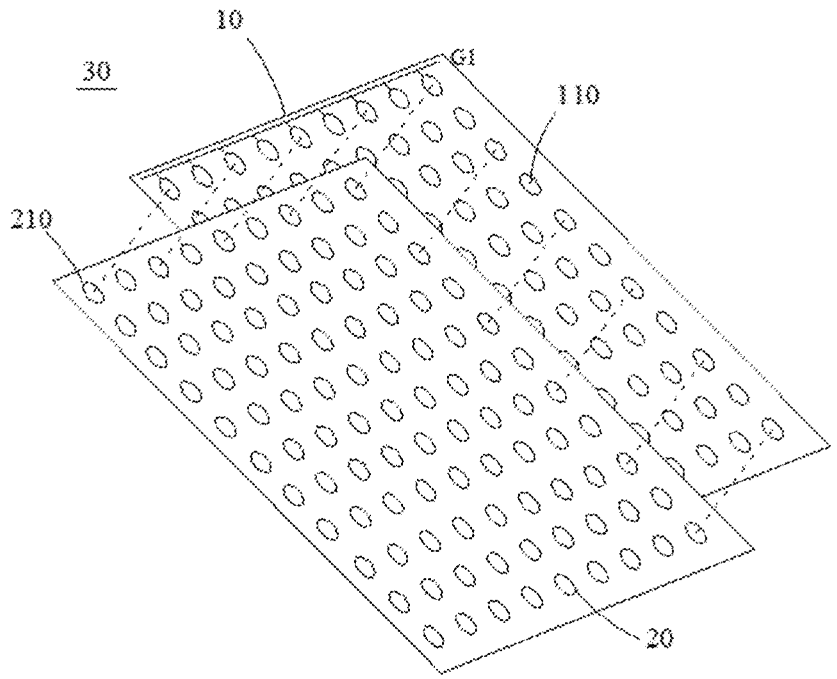
FIG. 3 is a structural diagram of the display device provided by the first embodiment of the present application from a second perspective.

FIG. 2 is a structural diagram of a display device 30 provided by the first embodiment of the present application from a first perspective (data lines are not shown in the figure). FIG. 3 is a structural diagram of the display device 30 provided by the first embodiment of the present application from a second perspective (data lines and scan lines except G1 are not shown in the figure). The first perspective and the second perspective are two different perspectives. As shown in FIGS. 2 and 3, the display device 30 includes a backlight module 20 and the display panel 10 as described above. The backlight module 20 includes a plurality of light-emitting elements 210 and a controller 220 (not shown in the figures). The number of the light-emitting elements 210 is equal to the number of the sub-pixels 110 of the display panel 10. The plurality of light-emitting elements 210 and the plurality of sub-pixels 110 are in a one-to-one correspondence, such that each light-emitting element 210 provides a light source for only one sub-pixel 110. The controller 220 may be connected to the plurality of light-emitting elements 210 to control the brightness of each light-emitting element 210. For a (j+1)-th sub-pixel 110 with the same target gray scale and connected to an i-th data line 130 of M data lines 130, the controller 220 controls a first brightness to be greater than a second brightness. The first brightness is the brightness of the light-emitting element 210 corresponding to the (j+1)-th sub-pixel 110 connected to the i-th data line 130 when a j-th sub-pixel 110 connected to the i-th data line 130 does not emit light. The second brightness is the brightness of the light-emitting element 210 corresponding to the (j+1)-th sub-pixel 110 connected to the i-th data line 130 when the j-th sub-pixel 110 connected to the i-th data line 130 emits light. That is, for the i-th data line 130, if the i-th data line 130 does not need to charge a certain sub-pixel 110, then when the i-th data line 130 charges the next sub-pixel 110, the controller 220 increases the brightness of the light-emitting element 210 corresponding to the next sub-pixel 110. Herein, the j-th sub-pixel 110 and the (j+1)-th sub-pixel 110 connected to the i-th data line 130 are arranged from top to bottom along the paper. It is understandable that in the embodiment shown in FIG. 1, M is equal to 10. In other embodiments not shown, M can be any integer greater than 2, such as 10, 13 or 7. In some specific embodiments, M is equal to 5761. i is an integer greater than 1 and less than M, and j is a positive integer.

In particular, when the display device 30 is in operation, an electric field is formed between the pixel electrode in the sub-pixel 110 of the display panel 10 and the common electrode. The liquid crystal is rotated under the action of the electric field, such that the light emitted by the light-emitting element 210 passes through the corresponding sub-pixel 110. When the i-th data line 130 of the M data lines does not need to charge the j-th sub-pixel 110 but needs to charge the (j+1)-th sub-pixel 110 (i.e., when the j-th sub-pixel 110 connected to the i-th data line 130 does not emit light but the (j+1)-th sub-pixel 110 connected to the i-th data line 130 emits light), the charging amount of the (j+1)-th sub-pixel 110 cannot reach the one required for light emission. That is, the voltage of the pixel electrode cannot reach the voltage required for light emission. As a result, the rotation angle of the liquid crystal is small, thereby leading to a low brightness of the (j+1)-th sub-pixel 110. Based on this, when the j-th sub-pixel 110 connected to the i-th data line 130 does not emit light, the brightness of the light-emitting element 210 corresponding to the (j+1)-th sub-pixel 110 connected to the i-th data line 130 is increased. Thus, the brightness of the (j+1)-th sub-pixel 110 connected to the i-th data line 130 is increased, such that the (j+1)-th sub-pixel 110 connected to the i-th data line 130 can have the actual gray scale that reaches the target gray scale thereof, so that the uniformity of brightness of the display panel 10 is improved. The target gray scale represents a target brightness of the sub-pixel 110, and the actual gray scale represents an actual brightness of the sub-pixel 110.

The implementation of the controller 220 for controlling the brightness of the light-emitting element 210 is described below.

The Second Embodiment

Figure 4:
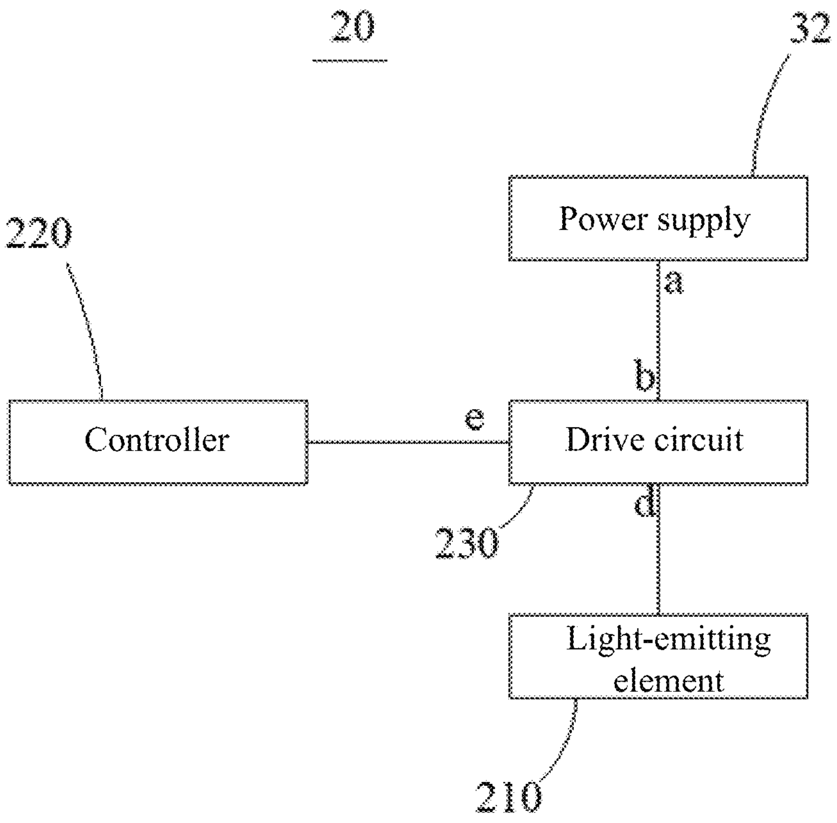
FIG. 4 is a circuit configuration of a backlight module provided by the second embodiment of the present application.

FIG. 4 is a circuit configuration of a backlight module 20 according to the second embodiment of the present application. As shown in FIG. 4, the backlight module 20 further includes a plurality of drive circuits 230.

In particular, the number of the drive circuits 230 is equal to that of the light-emitting elements 210. The plurality of drive circuits 230 and the plurality of light-emitting elements 210 are in a one-to-one correspondence, such that each drive circuit 230 drives only one light-emitting element 210 to emit light. Each of the plurality of drive circuits 230 has a first input terminal b, a second input terminal e, and an output terminal d. The first input terminal b of each drive circuit 230 is connected to an output terminal a of a power supply 32, the output terminal d of each drive circuit 230 is connected to the corresponding light-emitting element 210, and the second input terminal e of each drive circuit 230 is connected to the controller 220. In this way, when working, the controller 220 can control the brightness of each light-emitting element 210 by controlling a drive current output by each drive circuit 230 to the corresponding light-emitting element 210. Generally, a greater drive current output by the drive circuit 230 to the corresponding light-emitting element 210 can lead to a higher brightness of the corresponding light-emitting element 210. Therefore, in this embodiment, the working process of the controller 220 is described below: for the (j+1)-th sub-pixel 110 with the same target gray scale and connected to the i-th data line 130, the controller 220 controls the drive current output by the drive circuit 230 corresponding to the light-emitting element 210 corresponding to the (j+1)-th sub-pixel 110 connected to the i-th data line 130 when the j-th sub-pixel 110 connected to the i-th data line 130 does not emit light to be greater than the drive current output by the drive circuit 230 corresponding to the light-emitting element 210 corresponding to the (j+1)-th sub-pixel 110 connected to the i-th data line 130 when the j-th sub-pixel 110 connected to the i-th data line 130 emits light. That is, when the j-th sub-pixel 110 connected to the i-th data line 130 does not emit light, the drive current output by the drive circuit 230 corresponding to the light-emitting element 210 corresponding to the (j+1)-th sub-pixel 110 connected to the i-th data line 130 is increased. Therefore, the brightness of the (j+1)-th sub-pixel 110 connected to the i-th data line 130 is increased, such that the (j+1)-th sub-pixel 110 connected to the i-th data line 130 can have the actual gray scale that reaches the target gray scale thereof, so that the uniformity of brightness of the display panel 10 is improved.

Figure 5:
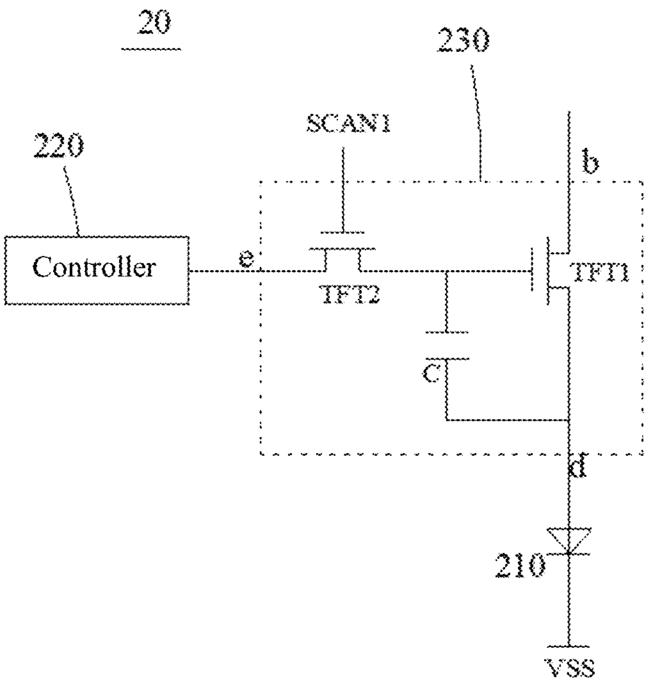
FIG. 5 is a schematic circuit configuration of a drive circuit provided by the second embodiment of the present application.

FIG. 5 is a circuit configuration of the drive circuit 230 provided by the second embodiment of the present application. As shown in FIG. 5, the drive circuit 230 may include a first transistor TFT1, a second transistor TFT2, and a capacitor C. The first transistor TFT1 and the second transistor TFT2 are thin film transistors (Thin Film Transistors, TFTs). An input terminal of the first transistor TFT1 is connected to the output terminal a of the power supply 32. That is, the input terminal of the first transistor TFT1 forms the first input terminal b of the drive circuit 230. An output terminal of the first transistor TFT1 is connected to the light-emitting element 210 corresponding to the drive circuit 230. That is, the output terminal of the first transistor TFT1 forms the output terminal d of the drive circuit 230. A control terminal of the first transistor TFT1 is connected to the output terminal of the second transistor TFT2. The capacitor C is connected between the control terminal and the output terminal of the first transistor TFT1. In other words, a first electrode plate of the capacitor C is connected to the input terminal of the first transistor TFT1, and a second electrode plate of the capacitor C is connected to the control terminal of the first transistor TFT1. An input terminal of the second transistor TFT2 is connected to the controller 220. That is, the input terminal of the second transistor TFT2 forms the second input terminal e of the drive circuit 230. A control terminal of the second transistor TFT2 is configured to input a SCAN1 signal. In some specific embodiments, the light-emitting element 210 is a sub-millimeter light-emitting diode (mini LED) or a micro light-emitting diode (micro LED), where mini LED refers to an LED with a size between 100 microns and 200 microns, and micro LED refers to an LED with a size below 100 microns. An anode of the light-emitting element 210 can be connected to the output terminal of the first transistor TFT1, and a cathode of the light-emitting element 210 can be connected to a common ground terminal VSS.

The working process of the drive circuit 230 corresponding to the light-emitting element 210 is described as follows. In a first time period, the control terminal of the second transistor TFT2 inputs the SCAN1 signal to turn on the second transistor TFT2, and the controller 220 outputs a voltage. The voltage output by controller 220 can be written into the capacitor C and stored by the capacitor C. In a second time period after the first time period, the control terminal of the second transistor TFT2 no longer inputs the SCAN1 signal, and the second transistor TFT2 is turned off. The capacitor C discharges to the control terminal of the first transistor TFT1 to turn on the first transistor TFT1. When the first transistor TFT1 is turned on, a path is formed between the output terminal a of the power supply 32, the first transistor TFT1, the light-emitting element 210, and the common ground terminal, such that a current flows through the light-emitting element 210, and the light-emitting element 210 emits light. The brightness of the light-emitting element 210 depends on the output current of the first transistor TFT1, and the output current of the first transistor TFT1 depends on the voltage of the capacitor C, that is, the voltage output by the controller 220 to the capacitor C. Thus, when the controller 220 is in operation, by controlling the voltage output to the input terminal of the second transistor TFT2 of each drive circuit 230, the controller can control the drive current output by each drive circuit 230 to the corresponding light-emitting element 210, thereby controlling the brightness of each light-emitting element 210.

In a specific embodiment, the controller 220 stores a first correspondence relationship. The first correspondence relationship is a correspondence between the target gray scale and a first voltage. For example, the first correspondence relationship may be one shown in Table 1 below:

TABLE 1

| | | | | | | | | |
|---|---|---|---|---|---|---|---|---|
| Target gray scale | 000 | 001 | 002 | 003 | 004 | 005 | 006 | 007 |
| First voltage (V) | V0 | V1 | V2 | V3 | V4 | V5 | V6 | V7 |
| Target gray scale | 008 | 009 | 010 | 011 | 012 | 013 | 014 | 015 |
| First voltage (V) | V8 | V9 | V10 | V11 | V12 | V13 | V14 | V5 |
| Target gray scale | 016 | 017 | 018 | . . . | 252 | 253 | 254 | 255 |
| First voltage (V) | V16 | V17 | V16 | . . . | V252 | V253 | V254 | V255 |

The first correspondence relationship is applied to the case where the j-th sub-pixel 110 connected to the i-th data line 130 does not emit light. That is, when the j-th sub-pixel 110 connected to the i-th data line 130 does not emit light, the controller 220 obtains the corresponding first voltage from the first correspondence relationship according to the target gray scale of the (j+1)-th sub-pixel 110 connected to the i-th data line 130, and inputs a voltage to the input terminal of the second transistor TFT2 of the drive circuit 230 corresponding to the (j+1)-th sub-pixel 110 connected to the i-th data line 130 according to the first voltage.

For example, as shown in FIG. 1, when none of the R sub-pixels in the display panel 10 emit light, i is 5, and j is 2. That is, the second sub-pixel 110 connected to the fifth data line 130 (the fourth sub-pixel 110 connected to S5 in the second row) does not emit light. In this case, when G3 outputs the scan signal and the third sub-pixel 110 connected to S5 (the fifth sub-pixel 110 in the third row) emits light, the controller 220 obtains the corresponding first voltage from the first correspondence relationship according to the target gray scale of the third sub-pixel 110 connected to S5. For example, when the target gray scale of the third sub-pixel 110 connected to S5 is 016, the first voltage obtained by the controller 220 is V16, and the controller 220 can output a voltage of V16 to the input terminal of the second transistor TFT2 of the drive circuit 230 corresponding to the third sub-pixel 110 connected to S5.

When all the R sub-pixels do not emit light, i is 8, and j is 2. That is, the second sub-pixel 110 connected to the eighth data line 130 (the seventh sub-pixel 110 connected to S8 in the second row) does not emit light. In this case, when G3 outputs the scan signal and the third sub-pixel 110 connected to S8 (the eighth sub-pixel 110 in the third row) emits light, the controller 220 obtains the corresponding first voltage from the first correspondence relationship according to the target gray scale of the third sub-pixel 110 connected to S8. For example, when the target gray scale of the third sub-pixel 110 connected to S8 is 007, the first voltage obtained by the controller 220 is V7, and the controller 220 outputs a voltage of V7 to the input terminal of the second transistor TFT2 of the drive circuit 230 corresponding to the third sub-pixel 110 connected to S8.

The controller 220 further stores a second correspondence relationship. The second correspondence relationship is a correspondence between the target gray scale and a second voltage. For example, the second correspondence relationship may be one shown in Table 2 below:

TABLE 2

| | | | | | | |
|---|---|---|---|---|---|---|
| Target gray scale | 000 | 001 | 002 | 003 | 004 | 005 |
| Second voltage (V) | V0-0.015 | V1-0.3 | V2-0.45 | V3-0.6 | V4-0.75 | V5-0.9 |
| Target gray scale | 006 | 007 | 008 | 009 | 010 | 011 |
| Second voltage (V) | V6-1.05 | V7-1.2 | V8-1.35 | V9-1.37 | V10-1.39 | V11-1.41 |
| Target gray scale | 012 | 013 | 014 | 015 | 016 | . . . |
| Second voltage (V) | V12-1.43 | V13-1.45 | V14-1.47 | V15-1.49 | V16-1.51 | . . . |

The second correspondence relationship is applied to the case where the j-th sub-pixel 110 connected to the i-th data line 130 emits light. In this case, when the j-th sub-pixel 110 connected to the i-th data line 130 emits light, the controller 220 obtains the corresponding second voltage from the second correspondence relationship according to the target gray scale of the (j+1)-th sub-pixel 110 connected to the i-th data line 130, and inputs a voltage to the input terminal of the second transistor TFT2 of the drive circuit 230 corresponding to the (j+1)-th sub-pixel 110 connected to the i-th data line 130 according to the second voltage.

Still, for example, i is 5, and j is 2. That is, the second sub-pixel 110 connected to the fifth data line 130 (the fourth sub-pixel 110 connected to S5 in the second row) emits light. In this case, when G3 outputs the scan signal and the third sub-pixel 110 connected to S5 (the fifth sub-pixel 110 in the third row) emits light, the controller 220 obtains the corresponding second voltage from the second correspondence relationship according to the target gray scale of the third sub-pixel 110 connected to S5. For example, when the target gray scale of the third sub-pixel 110 connected to S5 is 016, the second voltage obtained by the controller 220 is V16-1.51, and the controller 220 outputs a voltage of V16-1.51 to the input terminal of the second transistor TFT2 of the drive circuit 230 corresponding to the third sub-pixel 110 connected to S5. For the third sub-pixel 110 with the target gray scale of 016 and connected to S5, compared with the case when the second sub-pixel 110 connected to S5 emits light, when the second sub-pixel 110 connected to S5 does not emit light, the voltage output by the controller 220 to the input terminal of the second transistor TFT2 of the drive circuit 230 corresponding to the third sub-pixel 110 connected to S5 increases by 1.51 V. In this way, when the charging amount of the third sub-pixel 110 connected to S5 is insufficient, the sub-pixel 110 can still have the actual gray scale that reaches the target gray scale thereof, so that the uniformity of brightness of the display panel 10 is improved.

Still, for example, i is 8, and j is 2. That is, the second sub-pixel 110 connected to the eighth data line 130 (the seventh sub-pixel 110 connected to S8 in the second row) emits light. In this case, when G3 outputs the scan signal and the third sub-pixel 110 connected to S8 (the eighth sub-pixel 110 in the third row) emits light, the controller 220 obtains the corresponding second voltage from the second correspondence relationship according to the target gray scale of the third sub-pixel 110 connected to S8. For example, when the target gray scale of the third sub-pixel 110 connected to S8 is 007, the second voltage obtained by the controller 220 is V7-1.2, and the controller 220 outputs a voltage of V7-1.2 to the input terminal of the second transistor TFT2 of the drive circuit 230 corresponding to the third sub-pixel 110 connected to S8. For the third sub-pixel 110 with the target gray scale of 007 and connected to S8, compared with the case when the second sub-pixel 110 connected to S8 emits light, when the second sub-pixel 110 connected to S8 does not emit light, the voltage output by the controller 220 to the input terminal of the second transistor TFT2 of the drive circuit 230 corresponding to the third sub-pixel 110 connected to S8 increases by 1.2 V. In this way, when the charging amount of the third sub-pixel 110 connected to S8 is insufficient, the sub-pixel 110 can still have the actual gray scale that reaches the target gray scale thereof, so that the uniformity of brightness of the display panel 10 is improved.

In some specific embodiments, as shown in Table 1 and Table 2 listed above, when the target gray scale is greater than or equal to 0 and less than or equal to 8, a difference between the first voltage and the second voltage increases by 0.15 V each time when the target gray scale increases by 1. When the target gray scale is greater than 8 and less than or equal to 20, the difference value between the first voltage and the second voltage increases by 0.02 V each time when the target gray scale increases by 1. When the target gray scale is greater than 20 and less than or equal to 220, the difference value between the first voltage and the second voltage increases by 0.01 V each time when the target gray scale increases by 1. When the target gray scale is greater than 220 and less than or equal to 225, the difference value between the first voltage and the second voltage increases by 0.02 V each time when the target gray scale increases by 1. When the target gray scale is greater than 225 and less than or equal to 238, the difference value between the first voltage and the second voltage increases by 0.03 V each time when the target gray scale increases by 1. When the target gray scale is greater than 238 and less than or equal to 244, the difference value between the first voltage and the second voltage increases by 0.04 V each time when the target gray scale increases by 1. When the target gray scale is greater than 244 and less than or equal to 247, the difference value between the first voltage and the second voltage increases by 0.05 V each time when the target gray scale increases by 1. When the target gray scale is greater than 247 and less than or equal to 255, the difference value between the first voltage and the second voltage increases by 0.06 V each time when the target gray scale increases by 1.

In some specific embodiments, the controller 220 may set the first correspondence relationship and the second correspondence relationship for the R sub-pixels, the G sub-pixels, and the B sub-pixels separately. In this case, if the j-th sub-pixel 110 connected to the i-th data line 130 does not emit light, the (j+1)-th sub-pixel 110 connected to the i-th data line 130 emits light, and the (j+1)-th sub-pixel 110 connected to the i-th data line 130 is an R sub-pixel, then the controller 220 obtains the corresponding first voltage from the first correspondence relationship of the R sub-pixel. If the j-th sub-pixel 110 connected to the i-th data line 130 emits light, the (j+1)-th sub-pixel 110 connected to the i-th data line 130 emits light, and the (j+1)-th sub-pixel 110 connected to the i-th data line 130 is an R sub-pixel, then the controller 220 obtains the corresponding second voltage from the second correspondence relationship of the R sub-pixel. If the j-th sub-pixel 110 connected to the i-th data line 130 does not emit light, the (j+1)-th sub-pixel 110 connected to the i-th data line 130 emits light, and the (j+1)-th sub-pixel 110 connected to the i-th data line 130 is a G sub-pixel, then the controller 220 obtains the corresponding first voltage from the first correspondence relationship of the G sub-pixel. If the j-th sub-pixel 110 connected to the i-th data line 130 emits light, the (j+1)-th sub-pixel 110 connected to the i-th data line 130 emits light, and the (j+1)-th sub-pixel 110 connected to the i-th data line 130 is a G sub-pixel, then the controller 220 obtains the corresponding second voltage from the second correspondence relationship of the G sub-pixel. If the j-th sub-pixel 110 connected to the i-th data line 130 does not emit light, the (j+1)-th sub-pixel 110 not connected to the i-th data line 130 emits light, and the (j+1)-th sub-pixel 110 connected to the i-th data line 130 is a B sub-pixel, then the controller 220 obtains the corresponding first voltage from the first correspondence relationship of the B sub-pixel. If the j-th sub-pixel 110 connected to the i-th data line 130 emits light, the (j+1)-th sub-pixel 110 connected to the i-th data line 130 emits light, and the (j+1)-th sub-pixel 110 connected to the i-th data line 130 is a B sub-pixel, then the controller 220 obtains the corresponding second voltage from the second correspondence relationship of the B sub-pixel.

In some other specific embodiments, the controller 220 may set only one first correspondence relationship and one second correspondence relationship. In this case, if the j-th sub-pixel 110 connected to the i-th data line 130 does not emit light, and the (j+1)-th sub-pixel 110 connected to the i-th data line 130 emits light, then the controller 220 obtains the corresponding first voltage from the first correspondence relationship. If the j-th sub-pixel 110 connected to the i-th data line 130 emits light, and the (j+1)-th sub-pixel 110 connected to the i-th data line 130 emits light, then the controller 220 obtains the corresponding second voltage from the second correspondence relationship. In this specific embodiment, it is not necessary to distinguish the color of each sub-pixel 110.

Among some other embodiments not shown, in a parallel embodiment of the embodiment shown in FIG. 5, the drive circuit 230 also has a variable resistor. The controller 220 is connected to the variable resistor in each drive circuit 230. When the controller 220 is in operation, it can control the resistance of the variable resistor in each drive circuit 230 so as to control the drive current output by each drive circuit 230 to the corresponding light-emitting element 210, thereby controlling the brightness of each light-emitting element 210. For example, when it is necessary to increase the brightness of a certain light-emitting element 210, the controller 220 can control the resistance of the variable resistor in the drive circuit 230 corresponding to the light-emitting element 210 to be reduced. On the contrary, when it is necessary to reduce the brightness of a certain light-emitting element 210, the controller 220 can control the resistance of the variable resistor in the drive circuit 230 corresponding to the light-emitting element 210 to be increased. The details will not be repeated herein.

In the above embodiment, when the j-th sub-pixel 110 connected to the i-th data line 130 does not emit light and the charging amount of the (j+1)-th sub-pixel 110 connected to the i-th data line 130 is not sufficient, the brightness of the light-emitting element 210 corresponding to the (j+1)-th sub-pixel 110 connected to the i-th data line 130 is increased, so that the uniformity of brightness of the display panel 10 is improved. i is an integer greater than 1 and less than M, and j is a positive integer.

When the sub-pixels 110 are connected to the first data line 130 and the M-th data line 130 have a low brightness, the working principle of the backlight module 20 is further described in detail below.

Third Embodiment

For the first data line 130:

As shown in FIG. 1, in the display panel 10, the first data line 130 (S1) is connected to the input terminals of the switch circuits 120 corresponding to the first sub-pixels 110 in the odd-numbered rows (the first and third rows). When the display panel 10 displays a frame of image, if all the sub-pixels 110 connected to S1 emit light, the voltage in S1 is 0 before G1 outputs the scan signal. When G1 outputs the scan signal, S1 needs to output a data voltage (such as 7 V) to the first sub-pixel 110 in the first row. When G2 outputs the scan signal, S1 does not need to output the data voltage. When G3 outputs the scan signal, S1 needs to output a data voltage (such as 7 V) to the first sub-pixel 110 in the third row. That is, when G1 and G3 outputs the scan signals, the voltage in S1 needs to rise from 0 V to 7 V. In other words, when the display panel 10 displays a frame of image, if a p-th sub-pixel 110 connected to S1 emits light, the data voltage to be written by the p-th sub-pixel 110 connected to S1 needs to rise from 0 V to 7 V. If the charging amount of the p-th sub-pixel 110 connected to S1 is insufficient, the brightness of the sub-pixel 110 may be insufficient. p can be any positive integer.

Thus, when the controller 220 is in operation, if the target gray scale of the p-th sub-pixel 110 connected to S1 is equal to the target gray scale of the (j+1)-th sub-pixel 110 connected to Si, the controller 220 controls a third brightness to be equal to the first brightness. The third brightness is the brightness of the light-emitting element 210 corresponding to the p-th sub-pixel 110 connected to S1. That is, if the target gray scale of the p-th sub-pixel 110 connected to S1 is equal to the target gray scale of the (j+1)-th sub-pixel 110 connected to Si, the controller 220 controls the brightness of the light-emitting element 210 corresponding to the p-th sub-pixel 110 connected to S1 to be equal to the brightness of the light-emitting element 210 corresponding to the (j+1)-th sub-pixel 110 connected to Si when the j-th sub-pixel 110 connected to Si does not emit light. The color of the p-th sub-pixel 110 connected to the first data line 130 is the same as that of the (j+1)-th sub-pixel 110 connected to the i-th data line 130.

For example, as shown in FIG. 1, assuming that all the sub-pixels 110 in the display panel 10 emit light and the target gray scale of each sub-pixel 110 is equal, that is, the display panel 10 displays a solid color image. In this case, the controller 220 controls the brightness of the light-emitting element 210 corresponding to the first sub-pixel 110 (the first sub-pixel 110 in the first row) connected to S1 to be equal to the brightness of the light-emitting element 210 corresponding to the second sub-pixel 110 connected to S5 when the first sub-pixel 110 connected to S5 does not emit light. In the same way, the controller 220 controls the brightness of the light-emitting element 210 corresponding to the second sub-pixel 110 (the first sub-pixel 110 in the third row) connected to S1 to be equal to the brightness of the light-emitting element 210 corresponding to the second sub-pixel 110 connected to S5 when the first sub-pixel 110 connected to S5 does not emit light.

It should be noted that this embodiment is further extended on the basis of the first embodiment. That is, in the above example, the controller 220 controls the brightness of the light-emitting element 210 corresponding to the second sub-pixel 110 connected to S5 when the first sub-pixel 110 connected to S5 does not emit light to be greater than the brightness of the light-emitting element 210 corresponding to the second sub-pixel 110 connected to S5 when the first sub-pixel 110 connected to S5 emits light. On this basis, the controller 220 controls the brightness of the light-emitting elements 210 corresponding to the first sub-pixel 110 and the second sub-pixel 110 connected to S1 to be equal to the brightness of the light-emitting element 210 corresponding to the second sub-pixel 110 connected to S5 when the first sub-pixel 110 connected to S5 does not emit light.

Regarding the M-th Data Line 130:

As shown in FIG. 1, in the display panel 10, the M-th data line 130 (S10) is connected to the input terminals of the switch circuits 120 corresponding to the (M−1)-th sub-pixels 110 in the even-numbered rows (the second and fourth rows). When the display panel 10 displays a frame of image, if all the sub-pixels 110 connected to S10 emit light, the voltage in S10 is 0 before G2 outputs the scan signal. When G2 outputs the scan signal, S10 needs to output a data voltage (such as 7 V) to the ninth sub-pixel 110 in the second row. When G3 outputs the scan signal, S10 does not need to output the data voltage. When G4 outputs the scan signal, S10 needs to output a data voltage (such as 7 V) to the ninth sub-pixel 110 in the fourth row. That is, when G2 and G4 output the scan signals, the voltage in S10 needs to rise from 0 V to 7 V. In other words, when the display panel 10 displays a frame of image, if a p-th sub-pixel 110 connected to S10 emits light, the data voltage to be written by the p-th sub-pixel 110 connected to S10 needs to rise from 0 V to 7 V. If the charging amount of the p-th sub-pixel 110 connected to S10 is insufficient, the brightness of the sub-pixel 110 may be insufficient. p can be any positive integer.

Therefore, when the controller 220 is in operation, if the target gray scale of the p-th sub-pixel 110 connected to the M-th data line 130 is equal to the target gray scale of the (j+1)-th sub-pixel 110 connected to the i-th data line 130, the controller 220 controls a fourth brightness to be equal to the first brightness. The fourth brightness is the brightness of the light-emitting element 210 corresponding to the p-th sub-pixel 110 connected to the M-th data line 130. That is, if the target gray scale of the p-th sub-pixel 110 connected to the M-th data line 130 is equal to the target gray scale of the (j+1)-th sub-pixel 110 connected to the i-th data line 130, the controller 220 controls the brightness of the light-emitting element 210 corresponding to the p-th sub-pixel 110 connected to the M-th data line 130 to be equal to the brightness of the light-emitting element 210 corresponding to the (j+1)-th sub-pixel 110 connected to the i-th data line 130, when the j-th sub-pixel 110 connected to the i-th data line 130 does not emit light. The color of the p-th sub-pixel 110 connected to the M-th data line 130 is the same as that of the (j+1)-th sub-pixel 110 connected to the i-th data line 130.

For example, as shown in FIG. 1, assuming that all the sub-pixels 110 in the display panel 10 emit light and the target gray scale of each sub-pixel 110 is equal, that is, the display panel 10 displays a solid color image. In this case, the controller 220 controls the brightness of the light-emitting element 210 corresponding to the first sub-pixel 110 (the ninth sub-pixel 110 in the second row) connected to S10 to be equal to the brightness of the light-emitting element 210 corresponding to the second sub-pixel 110 connected to S7 when the first sub-pixel 110 connected to S7 does not emit light. In the same way, the controller 220 controls the brightness of the light-emitting element 210 corresponding to the second sub-pixel 110 (the ninth sub-pixel 110 in the fourth row) connected to S10 to be equal to the brightness of the light-emitting element 210 corresponding to the second sub-pixel 110 connected to S7 when the first sub-pixel 110 connected to S7 does not emit light.

It should also be noted that this embodiment is further extended on the basis of the first embodiment. That is, in the above example, the controller 220 controls the brightness of the light-emitting element 210 corresponding to the second sub-pixel 110 connected to S7 when the first sub-pixel 110 connected to S7 does not emit light to be greater than the brightness of the light-emitting element 210 corresponding to the second sub-pixel 110 connected to S7 when the first sub-pixel 110 connected to S7 emits light. On this basis, the controller 220 controls the brightness of the light-emitting elements 210 corresponding to the first sub-pixel 110 and the second sub-pixel 110 connected to S10 to be equal to the brightness of the light-emitting element 210 corresponding to the second sub-pixel 110 connected to S7 when the first sub-pixel 110 connected to S7 does not emit light.

Furthermore, in this embodiment, in order to solve the problem of low brightness of the sub-pixels 110 connected to the first data line 130 and the M-th data line 130, the brightness of the light-emitting elements 210 corresponding to the sub-pixels 110 connected to the first data line 130 and the M-th data line 130 is increased, so that the uniformity of brightness of the display panel 10 is improved.

when the first sub-pixel 110 connected to the i-th data line 130 has a low brightness, the working principle of the backlight module 20 is described in further detail below.

Fourth Embodiment

As shown in FIG. 1, in the display panel 10, before G1 outputs the scan signal, the voltage in Si is 0. Therefore, when G1 outputs the scan signal and the first sub-pixel 110 connected to Si emits light, Si needs to output a data voltage (such as 7 V) to the first sub-pixel 110 connected to Si. That is, when G1 outputs the scan signal, the voltage in Si needs to rise from 0 V to 7 V. In this case, the charging amount of the first sub-pixel 110 connected to Si is insufficient, so that low brightness of the sub-pixel 110 may be caused.

Therefore, when the controller 220 is in operation, if the target gray scale of the first sub-pixel 110 connected to Si is equal to the target gray scale of the (j+1)-th sub-pixel 110 connected to Si, the controller 220 controls the brightness of the light-emitting element 210 corresponding to the first sub-pixel 110 connected to Si to be equal to the brightness of the light-emitting element 210 corresponding to the (j+1)-th sub-pixel 110 connected to Si when the j-th sub-pixel 110 connected to Si does not emit light. The color of the first sub-pixel 110 connected to Si is the same as the color of the (j+1)-th sub-pixel 110 connected to the i-th data line 130.

For example, as shown in FIG. 1, assuming that all the sub-pixels 110 in the display panel 10 emit light and the target gray scale of each sub-pixel 110 is equal, that is, the display panel 10 displays a solid color image. In this case, the controller 220 controls the brightness of the light-emitting element 210 corresponding to the first sub-pixel 110 connected to S3 (the third sub-pixel 110 in the first row) to be equal to the brightness of the light-emitting element 210 corresponding to the third sub-pixel 110 connected to S3 when the second sub-pixel 110 connected to S3 does not emit light. In the same way, the controller 220 controls the brightness of the light-emitting element 210 corresponding to the first sub-pixel 110 connected to S6 (the third sub-pixel 110 in the first row) to be equal to the brightness of the light-emitting element 210 corresponding to the third sub-pixel 110 connected to S6 when the second sub-pixel 110 connected to S6 does not emit light.

Furthermore, in this embodiment, in order to solve the problem of low brightness of the first sub-pixel 110 connected to the i-th data line 130, the brightness of the light-emitting element 210 corresponding to the first sub-pixel 110 connected to the i-th data line 130 is increased, so that the uniformity of brightness of the display panel 10 is improved.

Fifth Embodiment

A display device 30 is further provided in the embodiment of the present application, the display device 30 includes a display panel 10 and the backlight module 20 according to any one of aforesaid embodiments.

Figure 6:
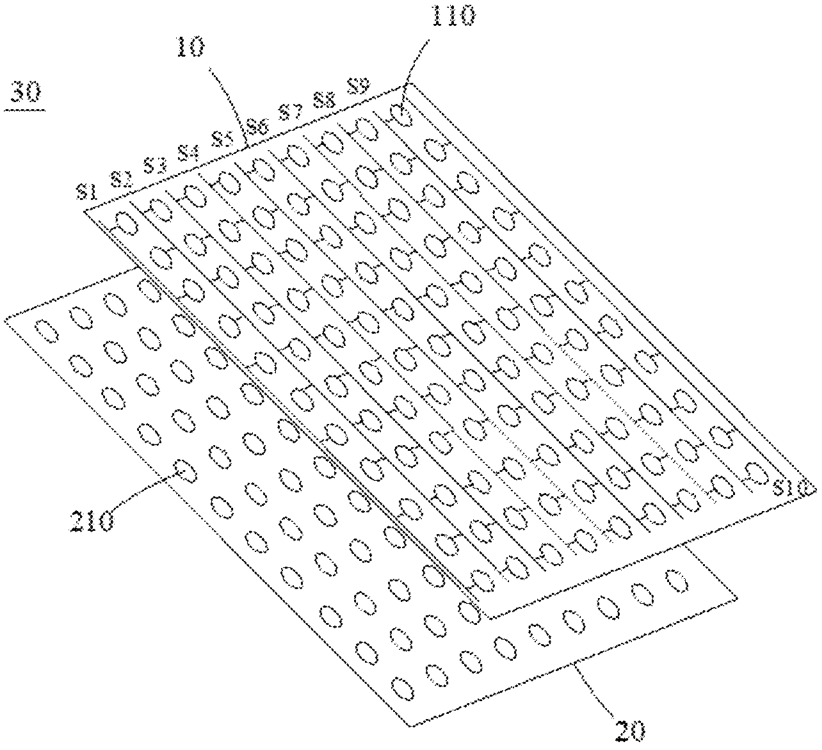
FIG. 6 is a structural diagram of a display device provided by the fifth embodiment of the present application.

In particular, FIG. 6 is a structural diagram of the display device provided by the fifth embodiment of the present application. As shown in FIG. 6, the display panel 10 includes a plurality of sub-pixels 110 and a plurality of data lines 130. Each of the plurality of data lines 130 is connected to at least two of the plurality of sub-pixels 110.

The backlight module 20 includes a plurality of light-emitting elements 210 and a controller 220. The plurality of light-emitting elements 210 and the plurality of sub-pixels 110 are in a one-to-one correspondence, such that the plurality of light-emitting elements 210 are served as light sources for the plurality of sub-pixels 110 respectively. The controller 220 is configured to control the brightness of each of the plurality of light-emitting elements 210. Among the M data lines 130, for the (j+1)-th sub-pixel 110 connected to the i-th data line 130 with the same target gray scale, the controller 220 controls the brightness of the light-emitting element 210 corresponding to the (j+1)-th sub-pixel 110 connected to the i-th data line 130 when the j-th sub-pixel 110 connected to the i-th data line 130 does not emit light to be greater than the brightness of the light-emitting element 210 corresponding to the (j+1)-th sub-pixel 110 connected to the i-th data line 130 when the j-th sub-pixel 110 connected to the i-th data line 130 emits light. i is an integer greater than 1 and less than M, and j is a positive integer.

In some embodiments, the backlight module 20 further includes a plurality of drive circuits 230, which are in a one-to-one correspondence with the plurality of light-emitting elements 210. Each of the plurality of drive circuits 230 has a first input terminal b connected to an output terminal a of a power supply 32 and an output terminal d connected to the corresponding light-emitting element 210. The controller 220 is connected to a second input terminal e of each of the plurality of drive circuits 230. The controller 220 controls the brightness of each light-emitting element 210 by controlling the drive current output by each drive circuit 230 to the corresponding light-emitting element 210.

In some embodiments, each of the drive circuits 230 includes a first transistor TFT1, a second transistor TFT2, and a capacitor C. The first transistor TFT1 has an input terminal connected to the output terminal a of the power supply 32, an output terminal connected to the light-emitting element 210 corresponding to the drive circuit 230, and a control terminal connected to an output terminal of the second transistor TFT2. The capacitor C has a first electrode plate connected to the input terminal of the first transistor TFT1 and a second electrode plate connected to the control terminal of the first transistor TFT1. An input terminal of the second transistor TFT2 is connected to the controller 220, and the controller 220 controls the drive current output by each drive circuit 230 to the corresponding light-emitting element 210 by controlling the voltage output to the input terminal of the second transistor TFT2.

In some embodiments, the controller 220 stores a first correspondence relationship. The first correspondence relationship is a correspondence between the target gray scale and the first voltage. The controller 220 is configured to: obtain, when the j-th sub-pixel 110 connected to the i-th data line 130 does not emit light, the corresponding first voltage from the first correspondence relationship according to the target gray scale of the (j+1)-th sub-pixel 110 connected to the i-th data line 130, and input a voltage to the input terminal of the second transistor TFT2 of the drive circuit 230 corresponding to the (j+1)-th sub-pixel 110 connected to the i-th data line 130 according to the first voltage. The controller 220 further stores a second correspondence relationship. The second correspondence relationship is a correspondence between the target gray scale and the second voltage. The first voltage corresponding to any target gray scale in the first correspondence relationship is greater than the second voltage corresponding to said any target gray scale in the second correspondence relationship. The controller 220 is configured to: obtain, when the j-th sub-pixel 110 connected to the i-th data line 130 emits light, the corresponding second voltage from the second correspondence relationship according to the target gray scale of the (j+1)-th sub-pixel 110 connected to the i-th data line 130, and input a voltage to the input terminal of the second transistor TFT2 of the drive circuit 230 corresponding to the (j+1)-th sub-pixel 110 connected to the i-th data line 130 according to the second voltage.

In some embodiments, when the target gray scale is greater than or equal to 0 and less than or equal to 8, the difference value between the first voltage and the second voltage increases by 0.15 V each time when the target gray scale increases by 1. When the target gray scale is greater than 8 and less than or equal to 20, the difference value between the first voltage and the second voltage increases by 0.02 V each time when the target gray scale increases by 1. When the target gray scale is greater than 20 and less than or equal to 220, the difference value between the first voltage and the second voltage increases by 0.01 V each time when the target gray scale increases by 1. When the target gray scale is greater than 220 and less than or equal to 225, the difference value between the first voltage and the second voltage increases by 0.02 V each time when the target gray scale increases by 1. When the target gray scale is greater than 225 and less than or equal to 238, the difference value between the first voltage and the second voltage increases by 0.03 V each time when the target gray scale increases by 1. When the target gray scale is greater than 238 and less than or equal to 244, the difference value between the first voltage and the second voltage increases by 0.04 V each time when the target gray scale increases by 1. When the target gray scale is greater than 244 and less than or equal to 247, the difference value between the first voltage and the second voltage increases by 0.05 V each time when the target gray scale increases by 1. When the target gray scale is greater than 247 and less than or equal to 255, the difference value between the first voltage and the second voltage increases by 0.06 V each time when the target gray scale increases by 1.

In some embodiments, among the M data lines 130, if the target gray scale of the p-th sub-pixel 110 connected to the first data line 130 is equal to the target gray scale of the (j+1)-th sub-pixel 110 connected to the i-th data line 130, the controller 220 controls the brightness of the light-emitting element 210 corresponding to the p-th sub-pixel 110 connected to the first data line 130 to be equal to the brightness of the light-emitting element 210 corresponding to the (j+1)-th sub-pixel 110 connected to the i-th data line 130 when the j-th sub-pixel 110 connected to the i-th data line 130 does not emit light. p is a positive integer. The color of the p-th sub-pixel 110 connected to the first data line 130 is the same as that of the (j+1)-th sub-pixel 110 connected to the i-th data line 130.

In some embodiments, if the target gray scale of the p-th sub-pixel 110 connected to the M-th data line 130 is equal to the target gray scale of the (j+1)-th sub-pixel 110 connected to the i-th data line 130 of the M data lines 130, the controller 220 controls the brightness of the light-emitting element 210 corresponding to the p-th sub-pixel 110 connected to the M-th data line 130 to be equal to the brightness of the light-emitting element 210 corresponding to the (j+1)-th sub-pixel 110 connected to the i-th data line 130 when the j-th sub-pixel 110 connected to the i-th data line 130 does not emit light. p is a positive integer. The color of the p-th sub-pixel 110 connected to the M-th data line 130 is the same as that of the (j+1)-th sub-pixel 110 connected to the i-th data line 130.

In some embodiments, each light-emitting element 210 is a mini LED or a micro LED.

In the embodiments of the present application, the backlight module 20 includes a plurality of light-emitting elements 210 and the controller 220. The plurality of light-emitting elements 210 serve as light sources for the plurality of sub-pixels 110 respectively. The controller 220 is configured to control the brightness of each light-emitting element 210. When the backlight module 20 is in operation, for the (j+1)-th sub-pixel 110 with the same target gray scale and connected to the i-th data line 130, the controller 220 controls the brightness of the light-emitting element 210 corresponding to the (j+1)-th sub-pixel 110 connected to the i-th data line 130 when the j-th sub-pixel 110 connected to the i-th data line 130 does not emit light to be greater than the brightness of the light-emitting element 210 corresponding to the (j+1)-th sub-pixel 110 connected to the i-th data line 130 when the j-th sub-pixel 110 connected to the i-th data line 130 emits light. That is, if the i-th data line 130 does not need to charge one of the plurality of sub-pixels 110 connected to the i-th data line 130, when the next sub-pixel 110 emits light, the controller 220 increases the brightness of the light-emitting element 210 corresponding to the next sub-pixel 110. In this way, the next sub-pixel 110 can have the actual gray scale that reaches the target gray scale thereof, so that the uniformity of brightness of the display device 30 is improved.

Furthermore, in order to solve the problem of low brightness of the sub-pixels 110 connected to the first data line 130 and the M-th data line 130, the brightness of the light-emitting elements 210 corresponding to the sub-pixels 110 connected to the first data line 130 and the M-th data line 130 is increased, so that the uniformity of brightness of the display device 30 is improved.

The aforesaid embodiments are merely intended to explain the technical solutions of the present application, rather than limiting the present application. Although the present application is described in detail with reference to the above embodiments, those of ordinary skill in the art should understand that they can still modify the technical solutions described in the aforesaid embodiments or make equivalent substitutions on some technical features therein without departing from the spirit of the technical solutions, and these modifications or substitutions should all fall within the protection scope of the present application.

What is claimed is:

1. A backlight module, applied to a display device comprising a display panel, wherein the display panel comprises a plurality of sub-pixels and M data lines; each of the M data lines is connected to at least two of the plurality of sub-pixels; M is an integer greater than 3;

the backlight module comprises a plurality of light-emitting elements and a controller; the plurality of light-emitting elements are in a one-to-one correspondence with the plurality of sub-pixels, such that the plurality of light-emitting elements serve as light sources for the plurality of sub-pixels respectively; the controller is configured to control a brightness of each of the plurality of light-emitting elements; and the controller is configured to control a first brightness to be greater than a second brightness when a target gray scale of a (j+1)-th sub-pixel connected to an i-th data line of the M data lines is constant, wherein the first brightness is the brightness of the light-emitting element corresponding to the (j+1)-th sub-pixel connected to the i-th data line when a j-th sub-pixel connected to the i-th data line does not emit light the second brightness is the brightness of the light-emitting element corresponding to the (j+1)-th sub-pixel connected to the i-th data line when the j-th sub-pixel connected to the i-th data line emits light, i is an integer greater than 1 and less than M, and j is a positive integer.

2. The backlight module according to claim 1, wherein the backlight module further comprises a plurality of drive circuits corresponding to the plurality of light-emitting elements, respectively; each of the plurality of drive circuits has a first input terminal connected to an output terminal of a power supply and an output terminal connected to the corresponding light-emitting element;

each of the plurality of drive circuits further has a second input terminal connected to the controller; and the controller is configured to control the brightness of each of the plurality of light-emitting elements by controlling a drive current output by each of the plurality of drive circuits to the corresponding light-emitting element.

3. The backlight module according to claim 2, wherein each of the plurality of drive circuits comprises a first transistor, a second transistor, and a capacitor, wherein, the first transistor has an input terminal connected to the output terminal of the power supply, an output terminal connected to the light-emitting element corresponding to the drive circuit, and a control terminal connected to an output terminal of the second transistor;

the capacitor has a first electrode plate connected to the input terminal of the first transistor and a second electrode plate connected to the control terminal of the first transistor;

an input terminal of the second transistor is connected to the controller; and the controller is configured to control the drive current output by each of the plurality of drive circuits to the corresponding light-emitting element by controlling a voltage output to the input terminal of the second transistor.

4. The backlight module according to claim 3, wherein the controller stores a first correspondence relationship between the target gray scale and a first voltage; the controller is configured to: obtain, when the j-th sub-pixel connected to the i-th data line does not emit light, the corresponding first voltage from the first correspondence relationship according to the target gray scale of the (j+1)-th sub-pixel connected to the i-th data line, and input a voltage to the input terminal of the second transistor of the drive circuit corresponding to the (j+1)-th sub-pixel connected to the i-th data line according to the first voltage;

the controller further stores a second correspondence relationship between the target gray scale and a second voltage; the first voltage corresponding to any target gray scale in the first correspondence relationship is greater than the second voltage corresponding to said any target gray scale in the second correspondence relationship; and the controller is configured to: obtain, when the j-th sub-pixel connected to the i-th data line emits light, the corresponding second voltage from the second correspondence relationship according to the target gray scale of the (j+1)-th sub-pixel connected to the i-th data line, and input a voltage to the input terminal of the second transistor of the drive circuit corresponding to the (j+1)-th sub-pixel connected to the i-th data line according to the second voltage.

5. The backlight module according to claim 4, wherein when the target gray scale is greater than or equal to 0 and is less than or equal to 8, a difference value between the first voltage and the second voltage increases by 0.15 V each time when the target gray scale increases by 1; when the target gray scale is greater than 8 and less than or equal to 20, the difference value between the first voltage and the second voltage increases by 0.02 V each time when the target gray scale increases by 1; when the target gray scale is greater than 20 and less than or equal to 220, the difference value between the first voltage and the second voltage increases by 0.01 V each time when the target gray scale increases by 1; when the target gray scale is greater than 220 and less than or equal to 225, the difference value between the first voltage and the second voltage increases by 0.02 V each time when the target gray scale increases by 1; when the target gray scale is greater than 225 and less than or equal to 238, the difference value between the first voltage and the second voltage increases by 0.03 V each time when the target gray scale increases by 1; when the target gray scale is greater than 238 and less than or equal to 244, the difference value between the first voltage and the second voltage increases by 0.04 V each time when the target gray scale increases by 1; when the target gray scale is greater than 244 and less than or equal to 247, the difference value between the first voltage and the second voltage increases by 0.05 V each time when the target gray scale increases by 1; and when the target gray scale is greater than 247 and less than or equal to 255, the difference value between the first voltage and the second voltage increases by 0.06 V each time when the target gray scale increases by 1.

6. The backlight module according to claim 1, wherein the controller is configured to control a third brightness to be equal to the first brightness if a target gray scale of a p-th sub-pixel connected to a first data line of the M data lines is equal to the target gray scale of the (j+1)-th sub-pixel connected to the i-th data line; the third brightness is the brightness of the light-emitting element corresponding to the p-th sub-pixel connected to the first data line; p is a positive integer; and a color of the p-th sub-pixel connected to the first data line is the same as a color of the (j+1)-th sub-pixel connected to the i-th data line.

7. The backlight module according to claim 1, wherein the controller is configured to control a fourth brightness to be equal to the first brightness if a target gray scale of a p-th sub-pixel connected to an M-th data line of the M data lines is equal to the target gray scale of the (j+1)-th sub-pixel connected to the i-th data line; the fourth brightness is the brightness of the light-emitting element corresponding to the p-th sub-pixel connected to the M-th data line; p is a positive integer; and a color of the p-th sub-pixel connected to the M-th data line is the same as a color of the (j+1)-th sub-pixel connected to the i-th data line.

8. The backlight module according to claim 1, wherein each of the plurality of light-emitting elements is a sub-millimeter light-emitting diode (mini LED) or a micro light-emitting diode (micro LED).

9. A display device, comprising a display panel and a backlight module;

wherein the display panel comprises a plurality of sub-pixels and M data lines; each of the M data lines is connected to at least two of the plurality of sub-pixels; said M is an integer greater than 3;

the backlight module comprises a plurality of light-emitting elements and a controller; the plurality of light-emitting elements are in a one-to-one correspondence with the plurality of sub-pixels, such that the plurality of light-emitting elements serve as light sources for the plurality of sub-pixels respectively; the controller is configured to control a brightness of each of the plurality of light-emitting elements; and the controller is configured to control a first brightness to be greater than a second brightness when a target gray scale of a (j+1)-th sub-pixel connected to an i-th data line of the M data lines is constant, wherein the first brightness is the brightness of the light-emitting element corresponding to the (j+1)-th sub-pixel connected to the i-th data line when a j-th sub-pixel connected to the i-th data line does not emit light, the second brightness is the brightness of the light-emitting element corresponding to the (j+1)-th sub-pixel connected to the i-th data line when the j-th sub-pixel connected to the i-th data line emits light, i is an integer greater than 1 and less than M, and j is a positive integer.

10. The display device according to claim 9, wherein the plurality of sub-pixels are arranged in N rows and M−1 columns, and j is a positive integer less than or equal to N−1; and wherein a first data line of the M data lines is connected to a first sub-pixel in an odd-numbered row, the M-th data line of the M data lines is connected to an (M−1)-th sub-pixel in an even-numbered row, and the i-th data line is connected to an i-th sub-pixel in the odd-numbered row and an (i-1)-th sub-pixel in the even-numbered row.

11. The display device according to claim 9, wherein the backlight module further comprises a plurality of drive circuits corresponding to the plurality of light-emitting elements, respectively; each of the plurality of drive circuits has a first input terminal connected to an output terminal of a power supply and an output terminal connected to the corresponding light-emitting element;

each of the plurality of drive circuits further has a second input terminal connected to the controller; and the controller is configured to control the brightness of each of the plurality of light-emitting elements by controlling a drive current output by each of the plurality of drive circuits to the corresponding light-emitting element.

12. The display device according to claim 11, wherein each of the plurality of drive circuits comprises a first transistor, a second transistor, and a capacitor, wherein, the first transistor has an input terminal connected to the output terminal of the power supply, an output terminal connected to the light-emitting element corresponding to the drive circuit, and a control terminal connected to an output terminal of the second transistor;

the capacitor has a first electrode plate connected to the input terminal of the first transistor and a second electrode plate connected to the control terminal of the first transistor;

an input terminal of the second transistor is connected to the controller; and the controller is configured to control the drive current output by each of the plurality of drive circuits to the corresponding light-emitting element by controlling a voltage output to the input terminal of the second transistor.

13. The display device according to claim 12, wherein the controller stores a first correspondence relationship between the target gray scale and a first voltage; the controller is configured to: obtain, when the j-th sub-pixel connected to the i-th data line does not emit light, the corresponding first voltage from the first correspondence relationship according to the target gray scale of the (j+1)-th sub-pixel connected to the i-th data line, and input a voltage to the input terminal of the second transistor of the drive circuit corresponding to the (j+1)-th sub-pixel connected to the i-th data line according to the first voltage;

the controller further stores a second correspondence relationship between the target gray scale and a second voltage; the first voltage corresponding to any target gray scale in the first correspondence relationship is greater than the second voltage corresponding to said any target gray scale in the second correspondence relationship; and the controller is configured to: obtain, when the j-th sub-pixel connected to the i-th data line emits light, the corresponding second voltage from the second correspondence relationship according to the target gray scale of the (j+1)-th sub-pixel connected to the i-th data line, and input a voltage to the input terminal of the second transistor of the drive circuit corresponding to the (j+1)-th sub-pixel connected to the i-th data line according to the second voltage.

14. The display device according to claim 13, wherein when the target gray scale is greater than or equal to 0 and is less than or equal to 8, a difference value between the first voltage and the second voltage increases by 0.15 V each time when the target gray scale increases by 1; when the target gray scale is greater than 8 and less than or equal to 20, the difference value between the first voltage and the second voltage increases by 0.02 V each time when the target gray scale increases by 1; when the target gray scale is greater than 20 and less than or equal to 220, the difference value between the first voltage and the second voltage increases by 0.01 V each time when the target gray scale increases by 1; when the target gray scale is greater than 220 and less than or equal to 225, the difference value between the first voltage and the second voltage increases by 0.02 V each time when the target gray scale increases by 1; when the target gray scale is greater than 225 and less than or equal to 238, the difference value between the first voltage and the second voltage increases by 0.03 V each time when the target gray scale increases by 1; when the target gray scale is greater than 238 and less than or equal to 244, the difference value between the first voltage and the second voltage increases by 0.04 V each time when the target gray scale increases by 1; when the target gray scale is greater than 244 and less than or equal to 247, the difference value between the first voltage and the second voltage increases by 0.05 V each time when the target gray scale increases by 1; and when the target gray scale is greater than 247 and less than or equal to 255, the difference value between the first voltage and the second voltage increases by 0.06 V each time when the target gray scale increases by 1.

15. The display device according to claim 9, wherein the controller is configured to control a third brightness to be equal to the first brightness if a target gray scale of a p-th sub-pixel connected to a first data line of the M data lines is equal to the target gray scale of the (j+1)-th sub-pixel connected to the i-th data line; the third brightness is the brightness of the light-emitting element corresponding to the p-th sub-pixel connected to the first data line; p is a positive integer; and a color of the p-th sub-pixel connected to the first data line is the same as a color of the (j+1)-th sub-pixel connected to the i-th data line.

16. The display device according to claim 9, wherein the controller is configured to control a fourth brightness to be equal to the first brightness if a target gray scale of a p-th sub-pixel connected to an M-th data line of the M data lines is equal to the target gray scale of the (j+1)-th sub-pixel connected to the i-th data line; the fourth brightness is the brightness of the light-emitting element corresponding to the p-th sub-pixel connected to the M-th data line; p is a positive integer; and a color of the p-th sub-pixel connected to the M-th data line is the same as a color of the (j+1)-th sub-pixel connected to the i-th data line.

* * * * *